United States Patent
Tae et al.

(10) Patent No.: US 10,254,580 B2
(45) Date of Patent: Apr. 9, 2019

(54) DISPLAY DEVICE HAVING A NON-RECTILINEAR DISPLAY AREA

(71) Applicant: Samsung Display Co., Ltd, Yongin-si, Gyeonggi-do (KR)

(72) Inventors: Changil Tae, Seoul (KR); Seungjun Yu, Cheonan-si (KR); Younggoo Song, Asan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/411,639

(22) Filed: Jan. 20, 2017

(65) Prior Publication Data
US 2017/0322446 A1   Nov. 9, 2017

(30) Foreign Application Priority Data

May 4, 2016  (KR) .................. 10-2016-0055317

(51) Int. Cl.
| | | |
|---|---|---|
| *G02F 1/1335* | (2006.01) | |
| *G02F 1/1333* | (2006.01) | |
| *G02F 1/1343* | (2006.01) | |
| *G02F 1/1362* | (2006.01) | |

(52) U.S. Cl.
CPC .. *G02F 1/133512* (2013.01); *G02F 1/133345* (2013.01); *G02F 1/134309* (2013.01); *G02F 1/136286* (2013.01); *G02F 2001/133357* (2013.01); *G02F 2001/134345* (2013.01); *G02F 2001/136222* (2013.01); *G02F 2201/123* (2013.01); *G02F 2201/56* (2013.01)

(58) Field of Classification Search
CPC ..... G02F 2001/136222; G02F 2201/56; G02F 1/133512
See application file for complete search history.

(56) References Cited

U.S. PATENT DOCUMENTS

| | | |
|---|---|---|
| 8,139,194 B2 | 4/2012 | Yamamoto et al. |
| 8,314,899 B2 | 11/2012 | Tanahara |
| 2008/0211980 A1* | 9/2008 | Shin ................. G02F 1/133512 349/39 |
| 2010/0134743 A1* | 6/2010 | Shin ........................ G02F 1/13 349/143 |

(Continued)

FOREIGN PATENT DOCUMENTS

| | | |
|---|---|---|
| JP | 2010-243875 A | 10/2010 |
| KR | 10-2008-0000492 A | 1/2008 |

(Continued)

OTHER PUBLICATIONS

US 8,243,221 B2, 08/2012, Tanahara (withdrawn)

*Primary Examiner* — Kendrick Hsu
(74) *Attorney, Agent, or Firm* — Innovation Counsel LLP

(57) ABSTRACT

A display device includes a first substrate; a second substrate covering the first substrate; a liquid crystal layer between the first substrate and the second substrate; a plurality of pixels on the first substrate; and a light blocking member disposed on at least one of the first substrate and the second substrate, the light blocking member disposed in a curved area and defining a display area and a non-display area. The plurality of pixels includes a first pixel outside the curved area; and a second pixel in the curved area, and a pixel electrode of the first pixel has a different shape from a shape of a pixel electrode of the second pixel.

22 Claims, 19 Drawing Sheets

(56) References Cited

U.S. PATENT DOCUMENTS

2010/0289994 A1* 11/2010 Nonaka ............. G02F 1/133514
 349/108
2014/0043571 A1* 2/2014 Chang .................... G02F 1/139
 349/123

FOREIGN PATENT DOCUMENTS

KR 10-2008-0096879 A 11/2008
KR 10-2014-0051593 A 5/2014

* cited by examiner

DISPLAY DEVICE HAVING A NON-RECTILINEAR DISPLAY AREA

CROSS-REFERENCE TO RELATED APPLICATION

This application claims priority to Korean Patent Application No. 10-2016-0055317 filed on May 4, 2016, and all the benefits accruing therefrom under 35 U.S.C. § 119, the content of which is herein incorporated by reference in its entirety.

BACKGROUND

1. Field

Exemplary embodiments of the invention relate to a display device, and more particularly, to a display device that has a non-rectangular display area.

2. Description of the Related Art

Display devices can be classified as a liquid crystal display ("LCD") device, an organic light emitting diode ("OLED") display device, a plasma display panel ("PDP") device, an electrophoretic display ("EPD") device, and the like, based on a light emitting scheme thereof.

Among the different types of display devices, LCD devices include a display substrate and a cover substrate, each including an electrode formed thereon, and a liquid crystal layer interposed therebetween. In recent times, a color filter on array (COA) structure is employed, in which a color filter is disposed on the display substrate to enhance transmittance.

In addition, in order to prevent misalignment from occurring during the process of coupling the display substrate with a color filter and the cover substrate with a light blocking member, a black matrix on array (BOA) structure is employed, in which both of the color filter and the light blocking member are disposed on the display substrate.

As wearable devices, e.g., a smart watch and a head mount display, are currently being used in various fields, a demand on an LCD device including a display area having a curvature is growing.

The display area having a curvature may be realized using pixels arranged in a staircase shape and a light blocking member having a predetermined curvature. However, in such a case, the light blocking member is disposed on the pixels arranged in staircase shape to cause a step difference of the light blocking member such that liquid crystals may not be aligned in a desired direction. This incorrect alignment of liquid crystals may cause a smear to appear.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Exemplary embodiments are directed to a display device, including a display area having a curvature, which is significantly reduced in a smear appearing at a curved portion.

In accordance with one or more embodiments, a display device includes a first substrate; a second substrate covering the first substrate; a liquid crystal layer between the first substrate and the second substrate; a plurality of pixels on the first substrate; and a light blocking member disposed on at least one of the first substrate and the second substrate, the light blocking member disposed in a curved area and defining a display area and a non-display area. The plurality of pixels includes a first pixel outside the curved area; and a second pixel in the curved area, and a pixel electrode of the first pixel has a different shape from a shape of a pixel electrode of the second pixel.

The second pixel may be arranged to have an outline of a staircase.

The first pixel may include a greater number of liquid crystal domains than the number of liquid crystal domains of the second pixel.

The light blocking member covers less than all of the pixel electrode of the second pixel.

The pixel electrode of the first pixel may include a first sub-pixel electrode and a second sub-pixel electrode, each of the first sub-pixel electrode and the second sub-pixel electrode including a cross-shaped stem portion and a plurality of branch portions each diagonally extending in different directions, respectively, from the cross-shaped stem portion.

The pixel electrode of the second pixel may include a third sub-pixel electrode including a stem portion and a plurality of branch portions diagonally extending in no more than one direction from the stem portion; and a fourth sub-pixel electrode including a cross-shaped stem portion and a plurality of branch portions each diagonally extending in different directions, respectively, from the cross-shaped stem portion.

The branch portion of the third sub-pixel electrode may be substantially perpendicular to the curved portion.

The branch portion of the third sub-pixel electrode may be substantially parallel to the curved portion.

The light blocking member may include a first edge light blocking member that is positioned in the curved area outside an area on the second pixel and a second edge light blocking member on the second pixel.

The second edge light blocking member may be formed on less than all of the second pixel.

The plurality of pixels may include a gate line disposed on the first substrate and extending in a first direction; a data line disposed on the first substrate to be insulated from the gate line and extending in a second direction which intersects the first direction; and a color filter disposed on at least one of the first substrate and the second substrate and insulated from the gate line and the data line.

The second edge light blocking member may be disposed on a same layer as a layer on which the gate line is disposed.

The second edge light blocking member may include substantially a same material as that included in the gate line.

The second edge light blocking member may be disposed on a same layer as a layer on which the data line is disposed.

The second edge light blocking member may include substantially a same material as that included in the data line.

The second edge light blocking member may be disposed on a same layer as a layer on which the color filter is disposed.

The second edge light blocking member may include at least one color filter.

In accordance with one or more embodiments, a display device includes a first substrate; a plurality of pixels on the first substrate; and a light blocking member disposed on at least one of the first substrate and the second substrate and including a curved inner edge. The plurality of pixels include: a gate line and a data line disposed on the first substrate and extending in non-parallel directions; a color filter disposed on the first substrate and insulated from the gate line and the data line; and a passivation layer on the color filter. The passivation layer includes a first passivation layer overlapping the light blocking member; and a second passivation layer not overlapping the first edge light blocking member. A height of the first passivation layer is lower than a height of the second passivation layer.

The color filter may be absent below the first passivation layer.

The light blocking member may be disposed on a same layer as a layer on which the color filter is disposed.

The light blocking member may include at least one color filter.

In another aspect, the inventive concept pertains to a display device that includes a substrate having a curved outer edge and a curved area adjacent to the curved outer edge. A plurality of first pixels are disposed on the substrate in rows and columns, wherein the number of first pixels in the rows varies. A plurality of second pixels including a second pixel is positioned at an end of each row wherein the end is in the curved area, wherein each second pixel has a pixel electrode that is shaped differently from a pixel electrode of the first pixel. A light blocking member is disposed on only the second pixels out of the first and second pixels.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and aspects of the present disclosure of invention will be more clearly understood from the following detailed description taken in conjunction with the accompanying drawings, in which.

DETAILED DESCRIPTION

Figure 1:
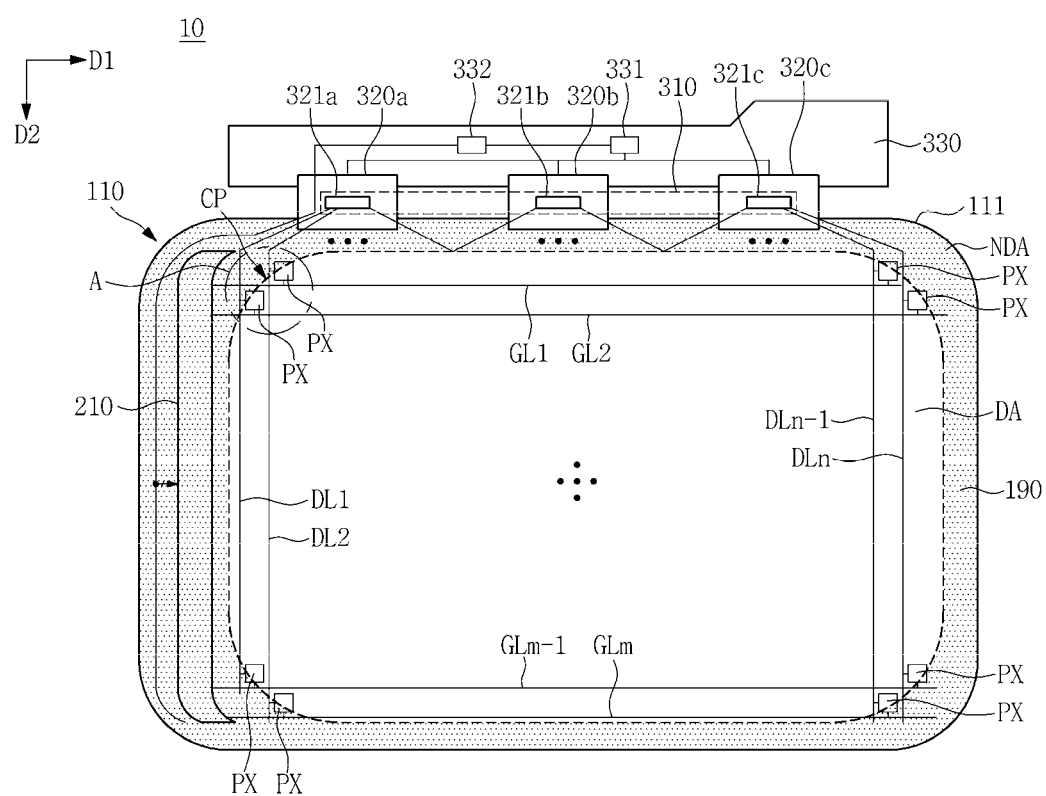
FIG. 1 is a plan view illustrating an exemplary embodiment of a liquid crystal display (LCD) device.

Exemplary embodiments will now be described more fully hereinafter with reference to the accompanying drawings. Although the invention can be modified in various manners and have several embodiments, exemplary embodiments are illustrated in the accompanying drawings and will be mainly described in the specification. However, the scope of the invention is not limited to the exemplary embodiments and should be construed as including all the changes, equivalents, and substitutions included in the spirit and scope of the invention.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe embodiments of the present invention, and like reference numerals refer to like elements throughout the specification.

Hereinafter, an exemplary embodiment of a display device will be described under the assumption that it is a liquid crystal display ("LCD") device. However, exemplary embodiments are not limited thereto, and the present invention may be applied to an organic light emitting diode ("OLED") display device.

Figure 2:
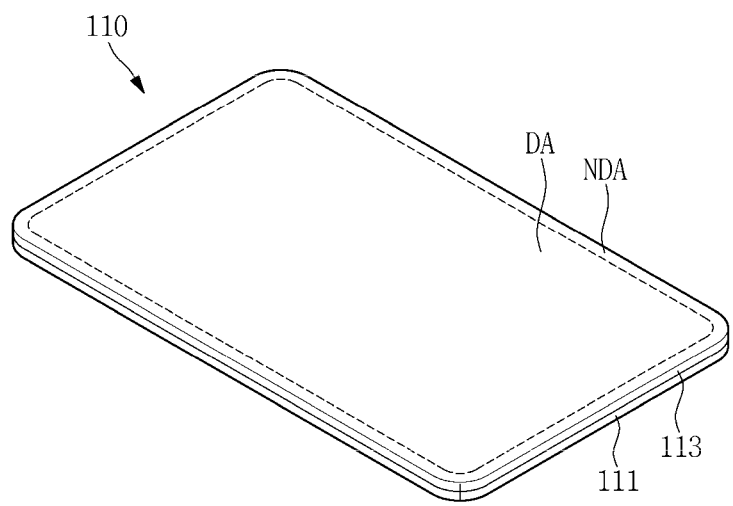
FIG. 2 is a perspective view illustrating an exemplary embodiment of an LCD device.
Figure 3:
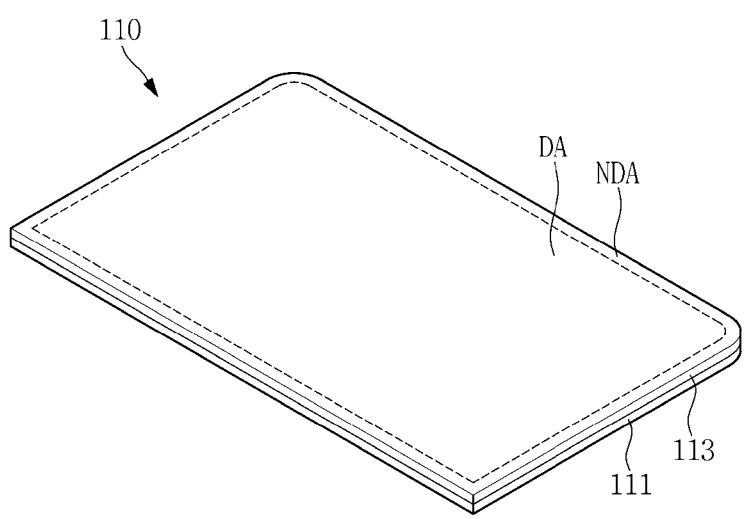
FIGS. 3, 4, and 5 are perspective views illustrating alternative exemplary embodiments of an LCD device.
Figure 4:
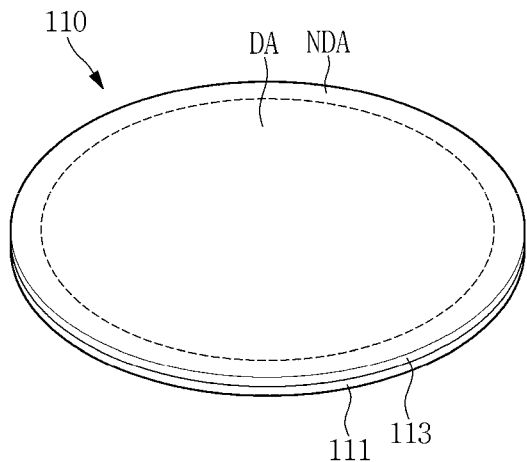
Figure 5:
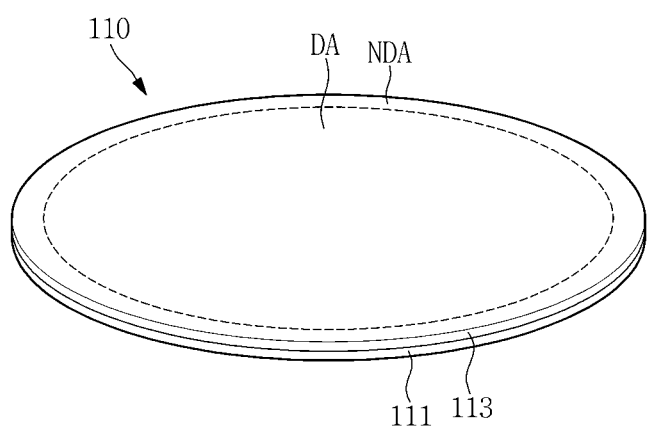

FIG. 1 is a plan view illustrating an exemplary embodiment of an LCD device, FIG. 2 is a perspective view illustrating an exemplary embodiment of an LCD device, and FIGS. 3, 4, and 5 are perspective views illustrating alternative exemplary embodiments of an LCD device.

Referring to FIG. 1, an exemplary embodiment of an LCD device 10 includes an LCD panel 110 which displays an image, a gate driver 210 which outputs a gate voltage to the LCD panel 110, and a data driver 310 which outputs a data voltage to the LCD panel 110.

Referring to FIG. 2, the LCD panel 110 includes a first substrate 111, a second substrate (not illustrated) covering the first substrate 111, and a liquid crystal layer (not illustrated) between the first substrate 111 and the second substrate.

The LCD panel 110 may have a substantially quadrangular shape with a corner portion having a predetermined curvature on a plane of the LCD panel 110. However, exemplary embodiments are not limited thereto, and the LCD panel 110 may have a quadrangular shape with right-angled corners.

The LCD panel 110 may include a display area DA in which an image is displayed and a non-display area NDA around the display area DA, and the display area DA may have substantially the same shape as that of the LCD panel 110 on a plane.

Referring to FIG. 3, the LCD panel 110 may have a substantially quadrangular shape, and may include at least one curved outer edge having a predetermined curvature.

For example, the LCD panel 110 may include two corner portions having a predetermined curvature in an upper portion or a lower portion thereof. In addition, the LCD panel 110 may include two curved outer edges having a predetermined curvature, e.g. in a left portion and a right portion.

In addition, referring to FIG. 4, the LCD panel 110 may have a substantially circular shape, and referring to FIG. 5, the LCD panel 110 may have a substantially elliptical shape.

Referring back to FIG. 1, the LCD panel 110 includes a plurality of gate lines GL1 to GLm (or GL) on the first substrate 111, a plurality of data lines DL1 to DLn (or DL) insulated from and intersecting the plurality of gate lines GL1 to GL, and a plurality of pixels PX which are connected to the plurality of gate lines GL1 to GLm and the plurality of data lines DL1 to DLn, respectively, to display an image.

The gate driver 210 is disposed adjacent to one end portion of the plurality of gate lines GL1 to GLm. The gate driver 210 is electrically connected to the one end portion of the plurality of gate lines GL1 to GLm and sequentially applies the gate voltage to the plurality of gate lines GL1 to GLm. In FIG. 1, the gate driver 210 is depicted as being disposed on one side (e.g., a left side) of the first substrate 111, but exemplary embodiments are not limited thereto. In an exemplary embodiment, the gate driver 210 may be disposed on another side (e.g., a right side) of the first substrate 111 or may be disposed on both sides of the first substrate 111.

The data driver 310 is disposed adjacent to one end portion of the plurality of data lines DL1 to DLn. The data driver 310 includes a plurality of driving circuit boards 320a, 320b, and 320c. For example, the plurality of driving circuit boards 320a, 320b, and 320c may be a tape carrier package (TCP) or a chip on film (COF). A plurality of data driving integrated circuits (ICs) 321a, 321b, and 321c are mounted on the plurality of driving circuit boards 320a, 320b, and 320c, respectively. The plurality of data driving ICs 321a, 321b, and 321c are electrically connected to the one end portion of the plurality of data lines DL1 to DLn to output the data voltage to the plurality of data lines DL1 to DLn.

The LCD device 10 further includes a control printed circuit board (PCB) 330 to control operations of the gate driver 210 and the plurality of data driving ICs 321a, 321b, and 321c. The control PCB 330 outputs a data control signal and an image data to control the operation of the plurality of data driving ICs 321a, 321b, and 321c, and outputs a gate control signal to control the operation of the gate driver 210.

The control PCB 330 includes a timing controller 331 which externally receives an image data and generates the data control signal and the gate control signal, and a gate control circuit 332 which generates the gate control signal. However, exemplary embodiments are not limited thereto, and the control PCB 330 may be a data PCB which receives a control signal from another PCB including a timing controller and thereby generates and outputs the data control signal.

The timing controller 331 controls operations of the plurality of data driving ICs 321a, 321b, and 321c and the gate driver 210. The gate control circuit 332 generates a clock signal to drive the gate driver 210 and a start signal to notice the start of the gate signal.

The control PCB 330 applies the data control signal and the image data to the plurality of data driving ICs 321a, 321b, and 321c through the plurality of driving circuit boards 320a, 320b, and 320c. In addition, the control PCB 330 applies the gate control signal to the gate driver 210 through the driving circuit board 320a that is adjacent to the gate driver 210.

However, exemplary embodiments are not limited thereto, and the plurality of data driving ICs 321a, 321b, and 321c may be directly disposed (e.g., embedded) in the LCD panel 110, disposed (e.g., embedded) on a flexible printed circuit film (not illustrated) to be attached to the LCD panel 110, or disposed (e.g., embedded) on a separate PCB (not illustrated). In an alternative exemplary embodiment, the plurality of data driving ICs 321a, 321b, and 321c, along with the gate lines GL1 to GLm and a thin film transistor ("TFT") (not illustrated), may be disposed (e.g., embedded) in the LCD panel 110. In an alternative exemplary embodiment, the plurality of data driving ICs 321a, 321b, and 321c, the timing controller 331, and the gate control circuit 332 may be integrated into a single chip.

Figure 6:
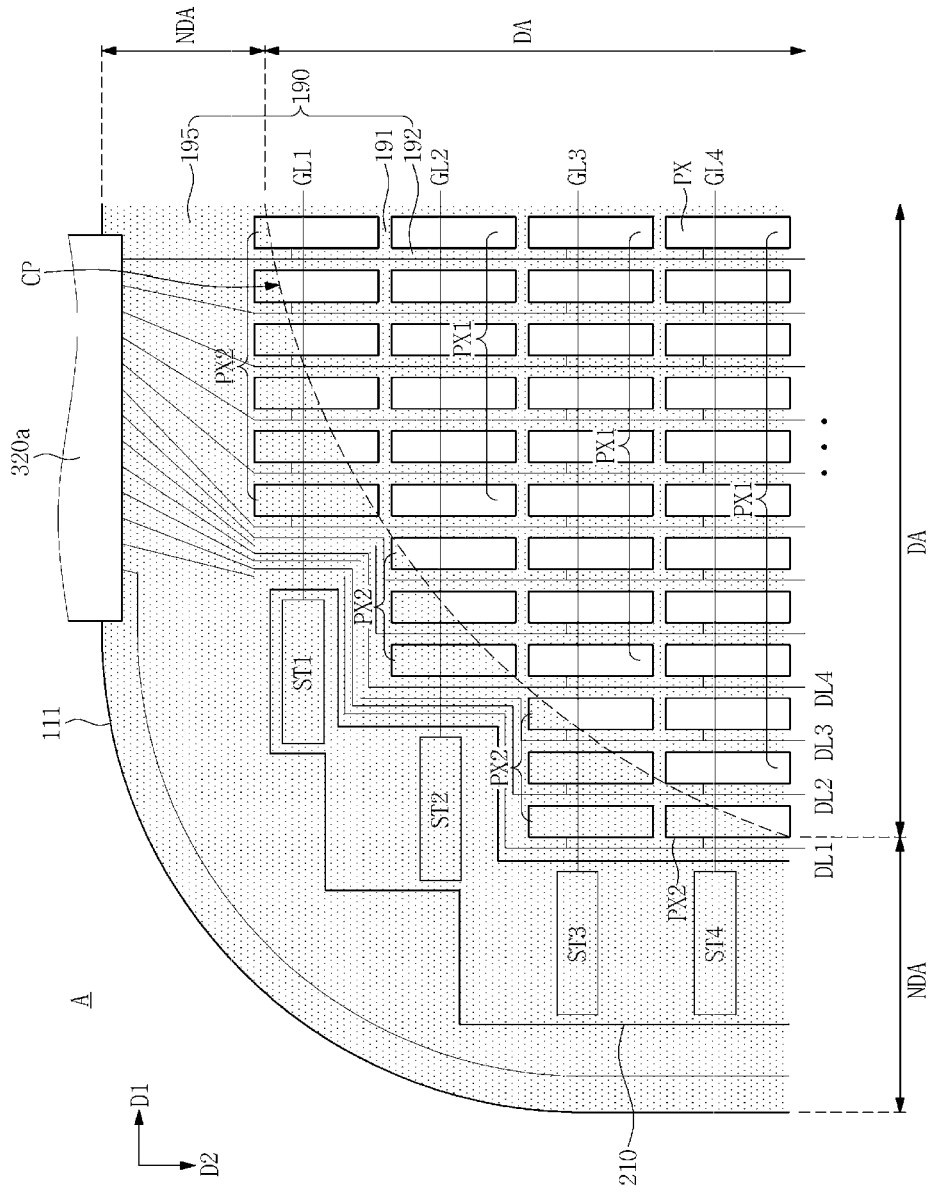
FIG. 6 is a partial enlarged view illustrating an area "A" of FIG. 1.
Figure 7:
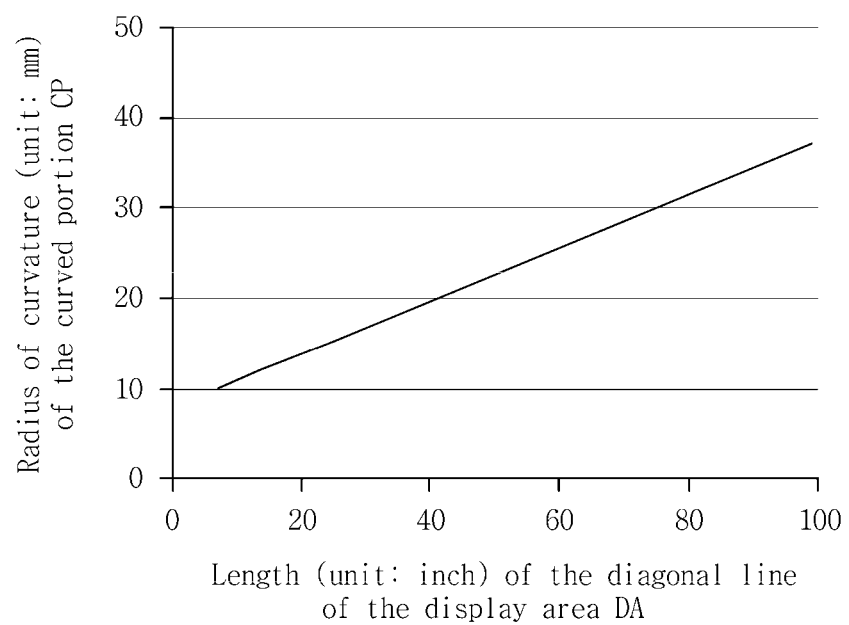
FIG. 7 is a graph illustrating a relationship between a size of a display area and a radius of curvature of a curved portion in an exemplary embodiment of an LCD device.

FIG. 6 is a partial enlarged view illustrating an area "A" of FIG. 1, and FIG. 7 is a graph illustrating a relationship between a size of a display area and a radius of curvature of a curved portion in an exemplary embodiment of an LCD device.

Referring to FIGS. 1 and 6, the LCD panel 110 further includes a light blocking member 190 on the first substrate 111. An exemplary embodiment of the LCD panel 110 is described under the assumption that the light blocking member 190 is disposed on the first substrate 111, but exemplary embodiments are not limited thereto. In an exemplary embodiment, the light blocking member 190 may be disposed on the second substrate (not illustrated). The light blocking member 190 is indicated with dotted shading in the figures.

The light blocking member 190 includes a first light blocking member 191 extending in a first direction D1, a second light blocking member 192 extending in a second direction D2 which intersects the first direction D1, and a first edge light blocking member 195 that has a curved inner edge CP. The area between the curved outer edge of the substrate 111 and the curved inner edge CP is herein referred to as the "curved area." The second light blocking member 192 may be omitted based on disposition of color filters, which will be described further below. While FIG. 6 shows the first light blocking member 191 as being disposed only between rows of pixels, this is done to clearly illustrate the pixel arrangement and in fact, there may be first light blocking member 191 disposed in select portions of the pixels. For example, as will be shown below in FIG. 11, the first light blocking member 191 may be disposed on the first transistor TR1 of the second pixel PX2 between two sub-pixel electrodes of a pixel.

The light blocking member 190 may use a black pigment or a black resin, and may use a combination of a red color filter and a blue color filter, for example. For example, a red color filter and a blue color filter may be stacked.

The first edge light blocking member 195 includes at least one curved inner edge CP having a predetermined curvature. A display area DA in which an image is displayed and a non-display area NDA in which an image is not displayed are defined by the first edge light blocking member 195.

Where a length of a diagonal line of the display area DA is "D" mm and a radius of curvature of the curved inner edge CP is "R" mm, "D" and "R" may satisfy, for example, the following Formula 1.

$$0.01 \times D + 5 \leq R \leq 0.01 \times D + 15$$

In addition, where a length of a diagonal line of the display area DA is "d" inches and a radius of curvature of the curved inner edge CP is "R" mm, "d" and "R" may satisfy, for example, the following Formula 2.

$$0.25 \times d + 5 \leq R \leq 0.25 \times d + 15 \qquad \text{[Formula 2]}$$

A relationship between the length (unit: inch) of the diagonal line of the display area DA and the radius of curvature (unit: mm) of the curved inner edge CP may be represented by the graph illustrated in FIG. 7.

Referring to FIGS. 1 and 6, the plurality of pixels PX include a first pixel PX1 not overlapping the curved inner edge CP of the first edge light blocking member 195 and a second pixel PX2 overlapping at least a portion of the curved inner edge CP of the first edge light blocking member 195. As shown, the first pixels are disposed in rows and columns, and the number of first pixels in a row varies according to the inner curved edge CP, to generally produce a similar outline as the curved inner edge CP. At least one second pixel is positioned at the end of each row that extends into the curved area.

An exemplary embodiment of the second pixel PX2 is depicted as being arranged in a staircase shape on a plane, but exemplary embodiments are not limited thereto. In another exemplary embodiment, the second pixel PX2 may be arranged in a matrix form.

As an exemplary embodiment of the second pixel PX2 is arranged in a staircase shape on a plane, the gate driver 210 and the data lines DL1 to DLn connected to the second pixel PX2 may be arranged in a staircase shape.

For example, the gate driver 210 includes a plurality of stages ST1, ST2, ST3, and ST4 connected to respective gate lines GL1 to GLm, and a stage connected to the second pixel PX2 may protrude toward the second pixel PX2. As such, as the plurality of stages are arranged in a staircase shape, an area of the non-display area NDA may be significantly reduced (e.g., minimized).

In addition, the data lines DL1 to DLn connected to the second pixel PX2 may extend to be bent into a staircase shape, but exemplary embodiments are not limited thereto. In another exemplary embodiment, the data lines DL1 to DLn may extend to be bent into a diagonal line or a curved shape.

A pixel electrode of the first pixel PX1 has a different shape from a shape of a pixel electrode of the second pixel PX2.

Figure 8:
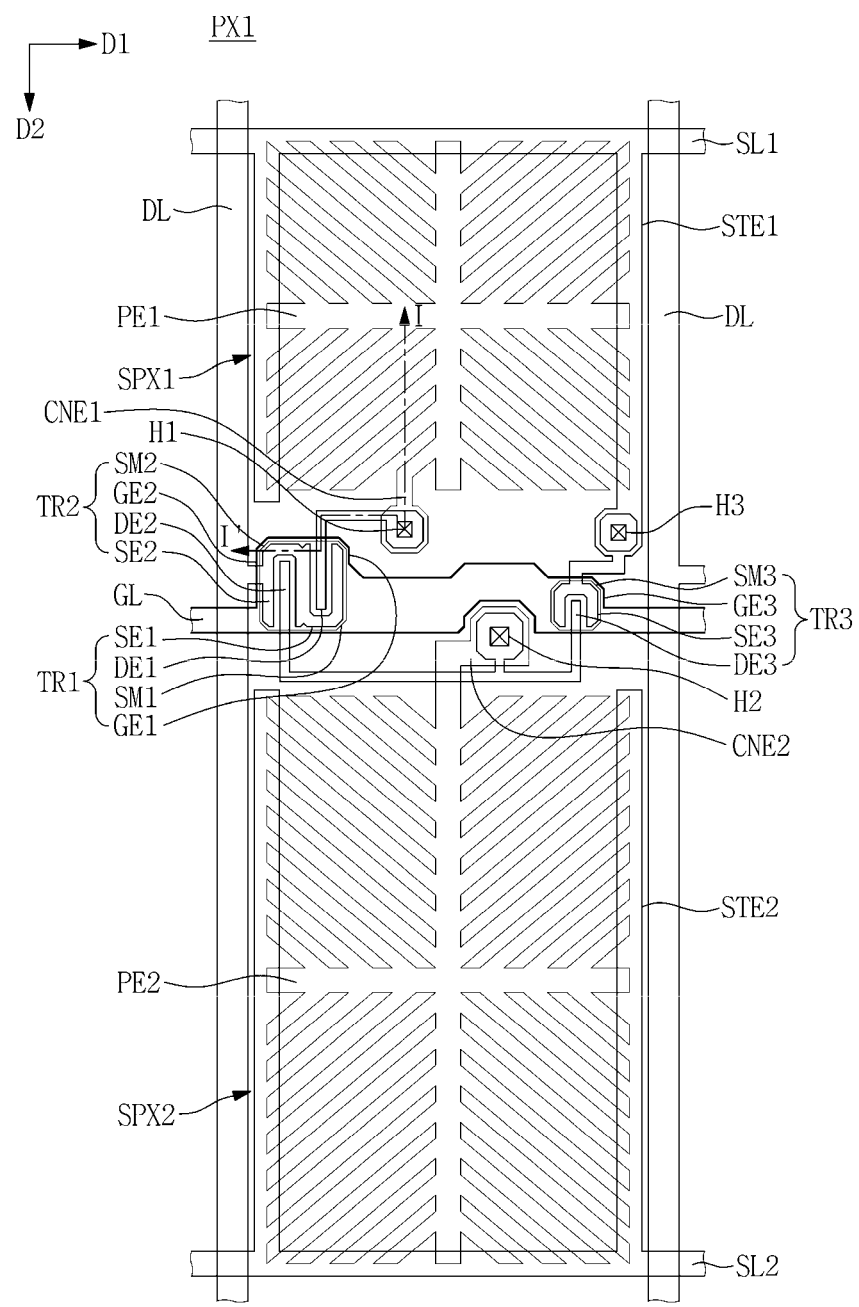
FIG. 8 is a plan view illustrating an exemplary embodiment of a first pixel.
Figure 9:
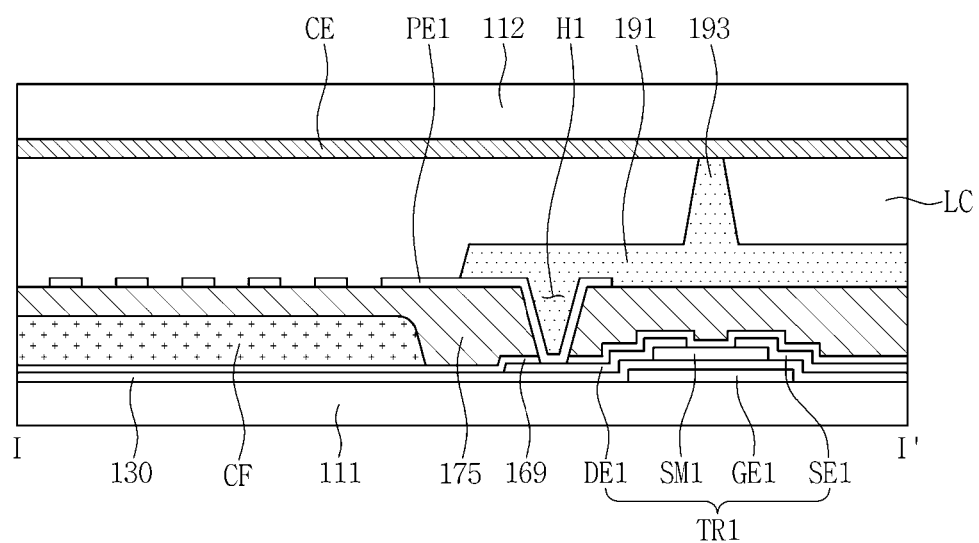
FIG. 9 is a cross-sectional view taken along line I-I' of FIG. 8.

FIG. 8 is a plan view illustrating an exemplary embodiment of a first pixel PX1, and FIG. 9 is a cross-sectional view taken along line I-I' of FIG. 8.

Referring to FIG. 8, an exemplary embodiment of the first pixel PX1 includes a first sub-pixel SPX1 and a second sub-pixel SPX2.

The first sub-pixel SPX1 includes a first TFT TR1, a first sub-pixel electrode PE1, and a first storage electrode STE1. The second sub-pixel SPX2 includes a second TFT TR2, a second sub-pixel electrode PE2, a second storage electrode STE2, and a third TFT TR3.

The first sub-pixel SPX1 may also be referred to as a high pixel, and the second sub-pixel SPX2 may also be referred to as a low pixel.

The first TFT TR1 of the first sub-pixel SPX1 includes a first gate electrode GE1 branching off from the gate line GL, a first semiconductor layer SM1 disposed to overlap the first gate electrode GE1, a first source electrode SE1 branching off from the data line DL and overlapping the first semiconductor layer SM1, and a first drain electrode DE1 spaced apart from the first source electrode SE1 and overlapping the first semiconductor layer SM1. The first drain electrode DE1 is connected to the first sub-pixel electrode PE1. For example, the first drain electrode DE1 extends toward the first sub-pixel electrode PE1 and is electrically connected, through the first contact hole H1, to a first connecting electrode CNE1 which branches off from the first sub-pixel electrode PE1.

The first storage electrode STE1 is connected to a first storage line SL1. The first sub-pixel electrode PE1 overlaps portions of the first storage line SL1 and the first storage electrode STE1 to define a first storage capacitor. The first storage electrode STE1 receives a storage voltage.

The second TFT TR2 of the second sub-pixel SPX2 includes a second gate electrode GE2 branching off from the gate line GL, a second semiconductor layer SM2 overlapping the second gate electrode GE2, a second source electrode SE2 branching off from the data line DL and overlapping the second semiconductor layer SM2, and a second drain electrode DE2 spaced apart from the second source electrode SE2 and overlapping the second semiconductor layer SM2. The second drain electrode DE2 is connected to the second sub-pixel electrode PE2. For example, the second drain electrode DE2 extends toward the second sub-pixel electrode PE2 and is electrically connected, through a second contact hole H2, to a second connecting electrode CNE2 which branches off from the second sub-pixel electrode PE2.

The third TFT TR3 of the second sub-pixel SPX2 includes a third gate electrode GE3 branching off from the gate line GL, a third source electrode SE3 electrically connected to the first storage electrode STE1 through a third contact hole H3, a third drain electrode DE3 extending from the second drain electrode DE2, and a third semiconductor layer SM3. The third source electrode SE3 and the first storage electrode STE1 are electrically connected to each other through the third contact hole H3. In addition, the third drain electrode DE3 is electrically connected to the second sub-pixel electrode PE2 through the second contact hole H2.

The second storage electrode STE2 is connected to a second storage line SL2. The second sub-pixel electrode PE2 overlaps portions of the second storage line SL2 and the second storage electrode STE2 to define a second storage capacitor. The second storage electrode STE2 receives the storage voltage.

Referring to FIGS. 8 and 9, the gate line GL, the first, second, and third gate electrodes GE1, GE2, and GE3 branching off from the gate line GL, the first storage line SL1, the first storage electrode STE1, the second storage line SL2, and the second storage electrode STE2 are disposed on the first substrate 111.

The gate insulating layer 130 is disposed on the first substrate 111 to cover the gate line GL, the first, second, and third gate electrodes GE1, GE2, and GE3, the first and second storage lines SL1 and SL2, and the first and second storage electrodes STE1 and STE2.

The first, second, and third semiconductor layers SM1, SM2, and SM3 are disposed on the gate insulating layer 130. The first, second, and third semiconductor layers SM1, SM2, and SM3 may include or be formed of amorphous silicon or an oxide semiconductor including at least one selected from the group consisting of: gallium (Ga), indium (In), tin (Sn), and zinc (Zn). For example, the oxide semiconductor includes at least one selected from the group consisting of: zinc oxide (ZnO), zinc-tin oxide (ZTO), zinc indium oxide (ZIO), indium oxide (InI), titanium oxide (TiO), indium-gallium-zinc oxide (IGZO), and indium-zinc-tin oxide (IZTO). Although not illustrated, an ohmic contact layer may be disposed on the first, second, and third semiconductor layers SM1, SM2, and SM3.

The data line DL extends in a longitudinal direction to be disposed on the gate insulating layer 130. The first, second, and third source electrodes SE1, SE2, and SE3 are disposed to overlap the first, second, and third semiconductor layers SM1, SM2, and SM3, respectively, and the first, second, and third drain electrodes DE1, DE2, and DE3 are disposed to overlap the first, second, and third semiconductor layers SM1, SM2, and SM3, respectively, and thus the first, second, and third TFTs TR1, TR2, and TR3 are formed.

The third source electrode SE3 of the third TFT TR3 is electrically connected to the first storage electrode STE1 through the third contact hole H3 which is defined through the gate insulating layer 130.

The insulating interlayer 169 is disposed to cover the data line DL and the first, second, and third TFTs TR1, TR2, and TR3. The insulating interlayer 169 covers upper portions of the first, second, and third semiconductor layers SM1, SM2, and SM3. The insulating interlayer 169 may have a monolayer or multilayer structure including silicon oxide, silicon nitride, a photosensitive organic material, and/or a silicon-based low dielectric constant insulating material, for example.

A color filter CF is disposed on the insulating interlayer 169.

The color filter CF is disposed to overlap the first and second sub-pixel electrodes PE1 and PE2 and imparts color to light that is transmitted through the pixel. The color filter CF may be one of a red color filter, a green color filter, and a blue color filter. In an alternative exemplary embodiment, the color filter CF may be a white color filter.

The color filter CF may be disposed on the first and second sub-pixel electrodes PE1 and PE2, or may extend along the second direction D2.

In addition, different colors of color filters CF may be disposed along the first direction D1, and in such an exemplary embodiment, the color filters CF disposed along the first direction D1 may overlap or may not overlap one another. In a case where the color filters CF disposed along the first direction D1 overlap one another, the aforementioned second light blocking member 192 (refer to FIG. 6) may be omitted.

The passivation layer 175 is disposed on the insulating interlayer 169 and the color filter CF. The passivation layer 175 may have a monolayer or multilayer structure including silicon oxide, silicon nitride, a photosensitive organic material, and/or a silicon-based low dielectric constant insulating material, for example.

The passivation layer 175 may planarize upper portions of the first, second, and third TFTs TR1, TR2, and TR3, and the color filter CF. Thus, the passivation layer 175 may also be referred to as a planarization layer.

Portions of the insulating interlayer 169 and the passivation layer 175 are removed such that the first contact hole H1 exposing a portion of the first drain electrode DE1 and the second contact hole H2 exposing a portion of the second drain electrode DE2 are defined.

The first sub-pixel electrode PE1 and the second sub-pixel electrode PE2 are disposed on the passivation layer 175. The first sub-pixel electrode PE1 is electrically connected to the first drain electrode DE1 through the first contact hole H1. The second sub-pixel electrode PE2 is electrically connected to the second drain electrode DE2 through the second contact hole H2.

Referring to FIG. 8, each of the first and second sub-pixel electrodes PE1 and PE2 includes a stem portion having a cross shape and a plurality of branch portions extending from the cross-shaped stem portion. The first and second sub-pixel electrodes PE1 and PE2 may include or be formed of a transparent conductive material. For example, the first and second sub-pixel electrodes PE1 and PE2 may include a transparent conductive material such as indium tin oxide (ITO), indium zinc oxide (IZO), indium tin zinc oxide (ITZO), aluminum zinc oxide (AZO), and the like.

Referring to FIG. 9, the first light blocking member 191 extending in the first direction D1 is disposed on the passivation layer 175. In addition, the column spacer 193 may further be disposed on the first light blocking member 191.

According to an exemplary embodiment, the light blocking member 190 and the column spacer 193 are simultaneously formed in a same process. The light blocking member 190 and the column spacer 193 are collectively referred to as a black column spacer BCS. In addition, a structure in which the light blocking member 190 and the first, second, and third TFTs TR1, TR2, and TR3 are disposed on a same substrate may be referred to as a black matrix on array (BOA) structure.

Although not illustrated, a lower alignment layer may be disposed on the first and second sub-pixel electrodes PE1 and PE2 and the light blocking member 190. The lower alignment layer may be a homeotropic alignment layer, and may include a photosensitive material.

The second substrate 112 is an insulating substrate including a transparent material such as glass or plastic.

The common electrode CE is disposed on the second substrate 112. The common electrode CE may include or be formed of a transparent conductive oxide (TCO) such as indium tin oxide (ITO), indium zinc oxide (IZO), and aluminum zinc oxide (AZO), for example.

Although not illustrated, an upper alignment layer may be disposed on the common electrode CE. The upper alignment layer may include a same material as that included in the aforementioned lower alignment layer.

When a surface of the first substrate 111 and a surface of the second substrate 112 that face each other are defined as upper surfaces of the corresponding substrates, respectively, and surfaces opposite to their respective upper surface are defined as the respective lower surface of their corresponding substrates, polarizers may be disposed on the lower surface of the first substrate 111 and the lower surface of the second substrate 112, respectively.

The liquid crystal layer LC is disposed in a space which is maintained by the column spacer 193 and between the first substrate 111 and the second substrate 112.

The liquid crystal layer LC may include liquid crystal molecules. The liquid crystal molecules of the liquid crystal layer LC may have a structure in which a major axis thereof is aligned parallel to one of the first substrate 111 and the second substrate 112, and the direction is spirally twisted about 90 degrees from a rubbing direction of the alignment layer of the first substrate 111 to the second substrate 112. Alternatively, the liquid crystal layer LC may include homeotropic liquid crystal molecules.

Figure 10:
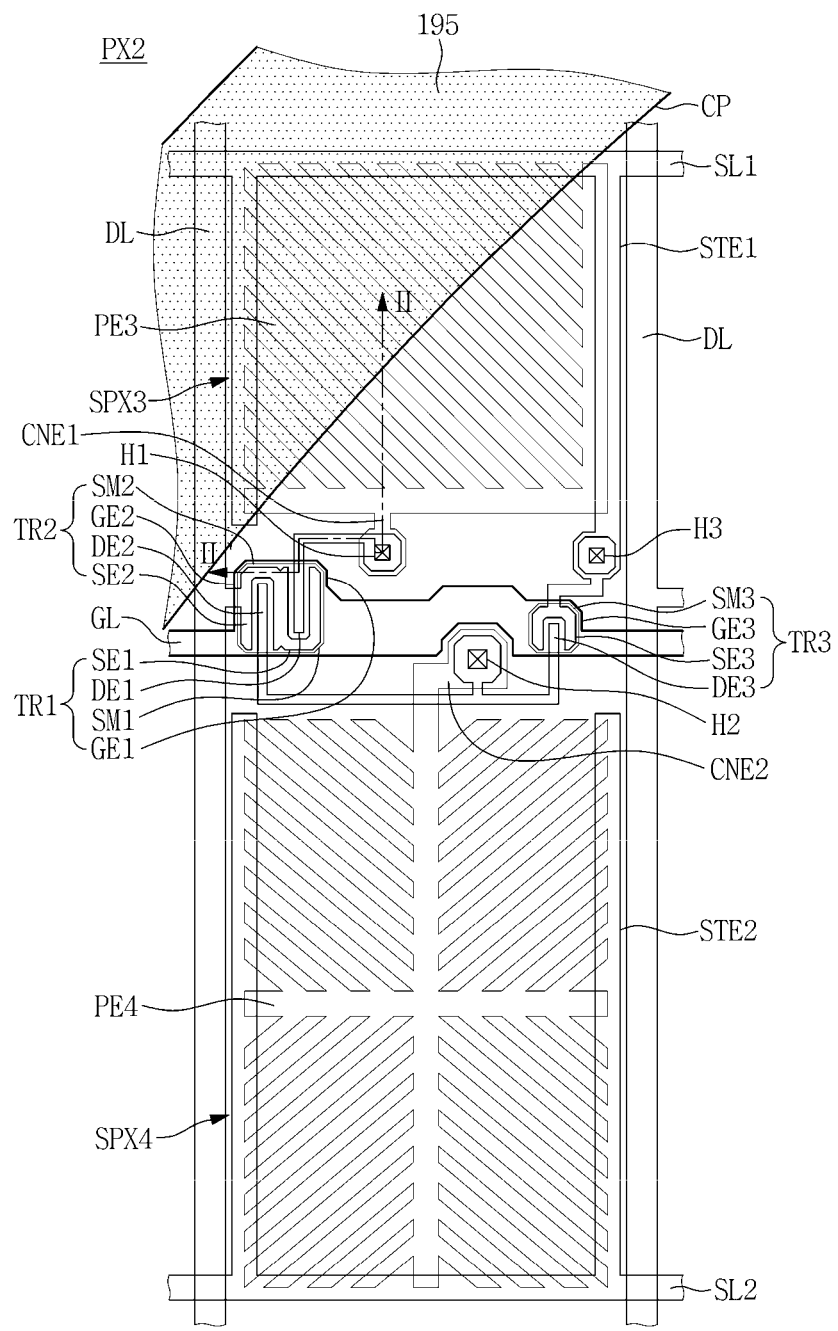
FIG. 10 is a plan view illustrating an exemplary embodiment of a second pixel.
Figure 11:
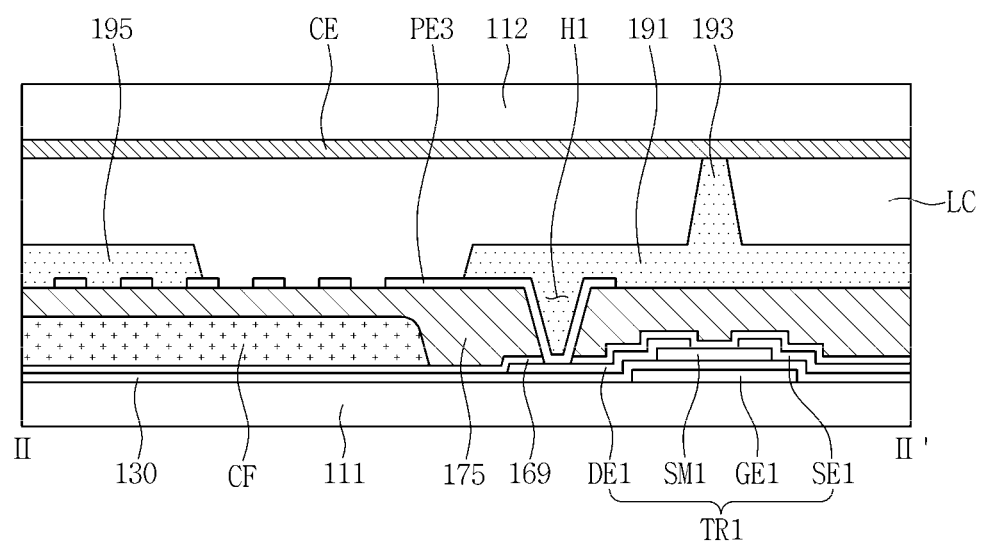
FIG. 11 is a cross-sectional view taken along line II-II' of FIG. 10.
Figure 12:
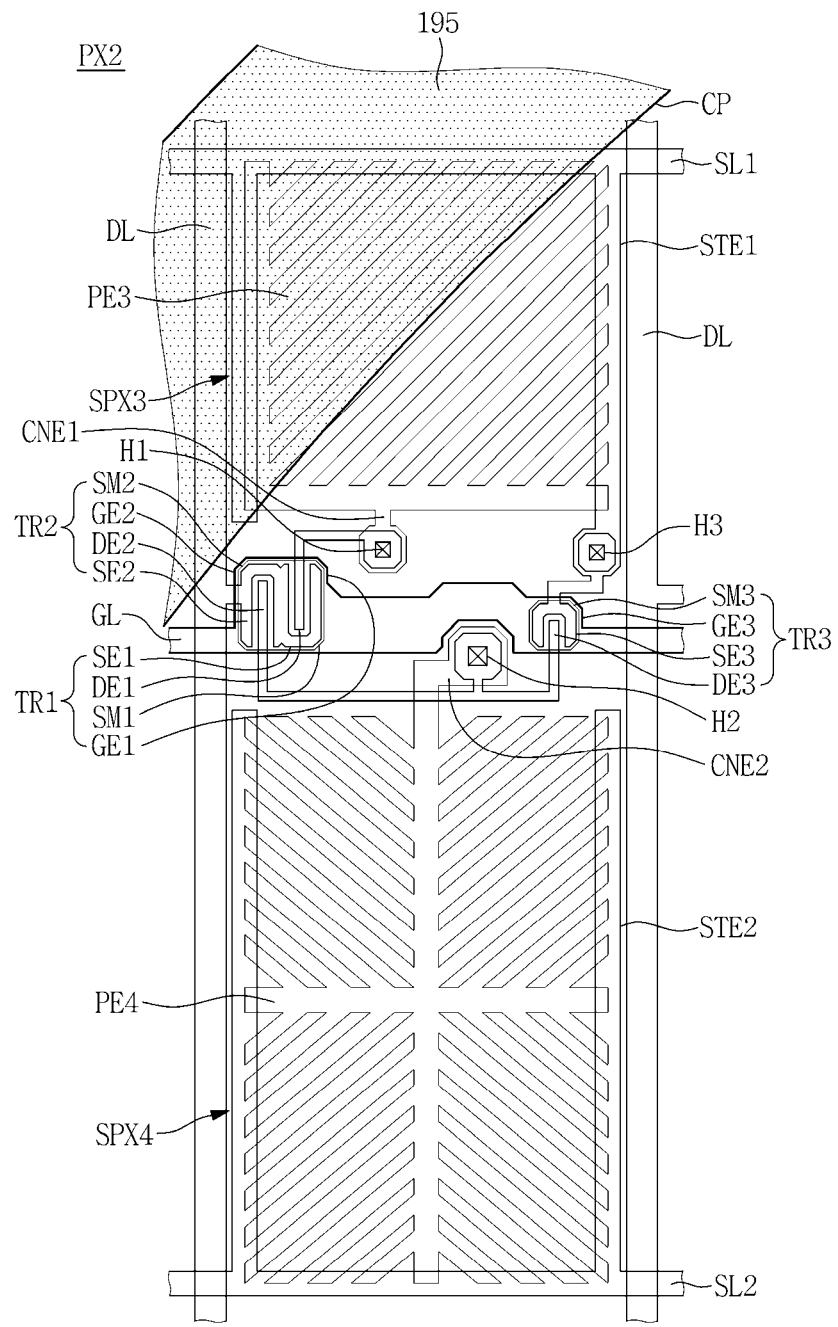
FIGS. 12 and 13 are plan views illustrating alternative exemplary embodiments of a second pixel.
Figure 13:
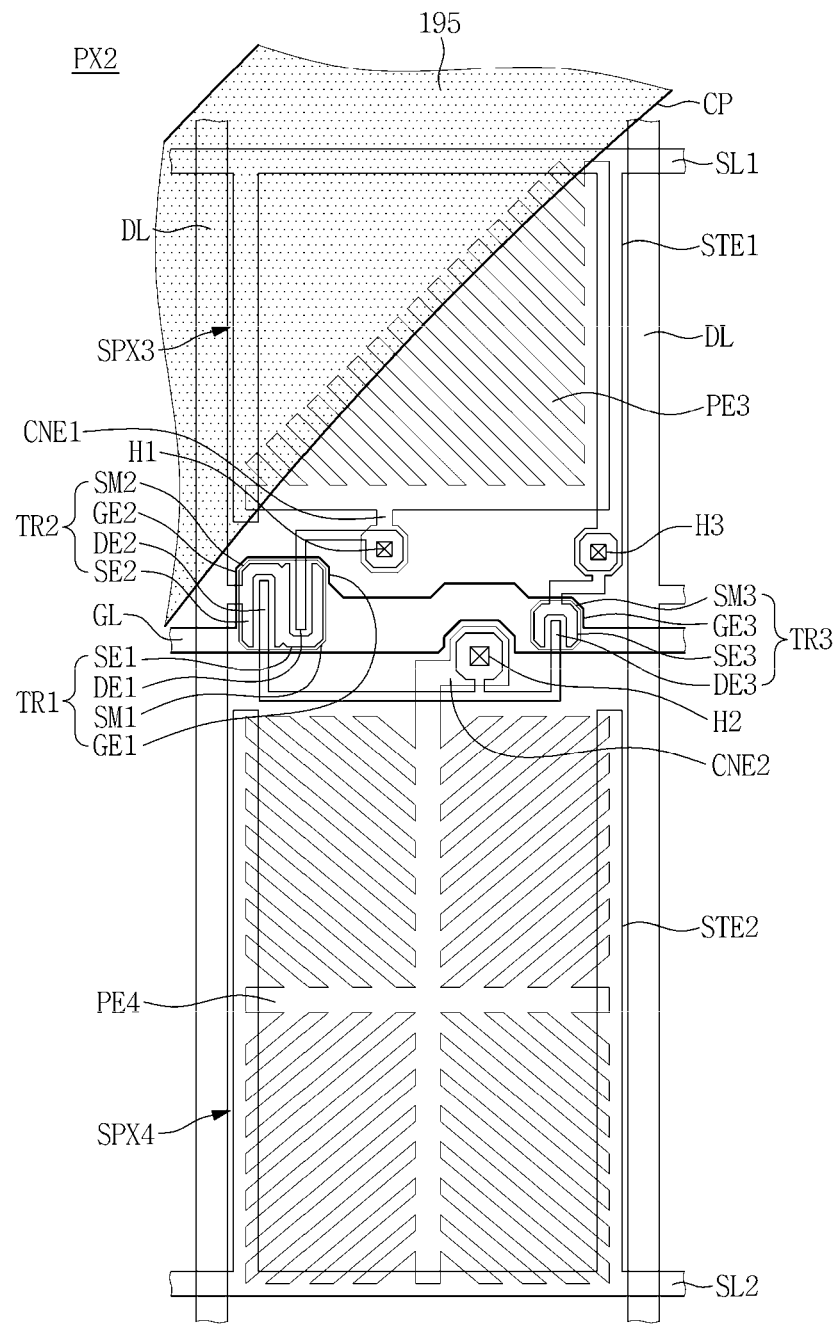

FIG. 10 is a plan view illustrating an exemplary embodiment of a second pixel PX2, and FIG. 11 is a cross-sectional view taken along line II-II' of FIG. 10. FIGS. 12 and 13 are plan views illustrating alternative exemplary embodiments of the second pixel PX2. Hereinafter, repeated descriptions described hereinabove with respect to the first pixel PX1 will be omitted in descriptions with respect to the second pixel PX2.

Referring to FIG. 10, an exemplary embodiment of the second pixel PX2 includes a third sub-pixel SPX3 and a fourth sub-pixel SPX4.

The third sub-pixel SPX3 includes the first TFT TR1, a third sub-pixel electrode PE3, and the first storage electrode STE1. The fourth sub-pixel SPX4 includes the second TFT TR2, a fourth sub-pixel electrode PE4, the second storage electrode STE2, and the third TFT TR3.

An exemplary embodiment of the third sub-pixel electrode PE3 is described under the assumption that the curved inner edge CP of the first edge light blocking member 195 overlaps the third sub-pixel electrode PE3 but does not overlap the fourth sub-pixel electrode PE4.

The third sub-pixel electrode PE3 may include a stem portion and a plurality of branch portions diagonally extending from the stem portion in no more than one direction, as shown in FIGS. 10, 12, and 13 for example. The fourth sub-pixel electrode PE4 may include a stem portion having a cross shape and a plurality of branch portions diagonally extending in different directions from the cross-shaped stem portion.

In such an exemplary embodiment, the third sub-pixel electrode PE3 which overlaps the first edge light blocking member 195 includes a single domain, but exemplary embodiments are not limited thereto. In another exemplary embodiment, the fourth sub-pixel electrode PE4 overlaps the first edge light blocking member 195 and the fourth sub-pixel electrode PE4 may have a single domain.

Accordingly, all liquid crystal molecules on the third sub-pixel electrode PE3 may be initially aligned in a same direction. As such, in an exemplary embodiment of the LCD device, although a step difference occurs due to the first edge light blocking member 195, the second pixel PX2 overlapping the first edge light blocking member 195 only has a single domain, such that occurrence of a smear may be prevented. The branch portion of the third sub-pixel electrode PE3 may be substantially perpendicular to the first edge light blocking member 195 (refer to FIG. 10) or may extend substantially parallel to the first edge light blocking member 195 (refer to FIG. 12).

In addition, referring to FIGS. 8 and 13, the third sub-pixel electrode PE3 of the second pixel PX2 may have less planar area than that of the first sub-pixel electrode PE1 of the first pixel PX1.

Figure 14:
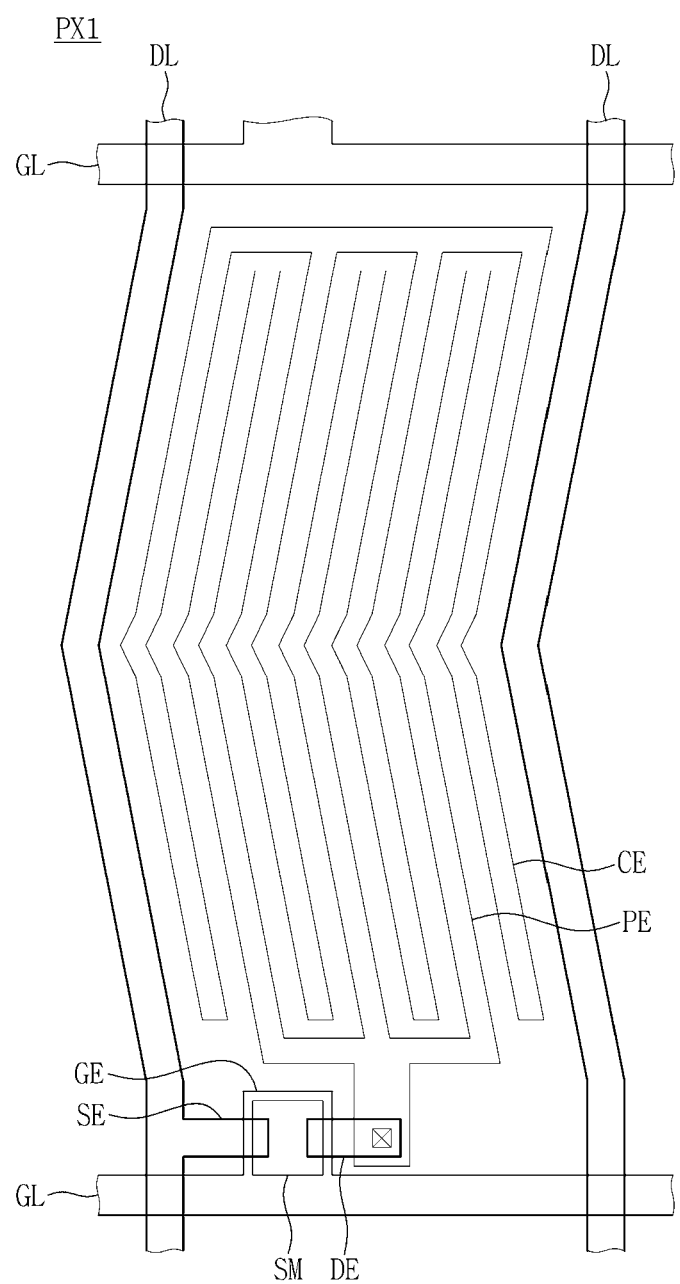
FIG. 14 is a plan view illustrating an alternative exemplary embodiment of a first pixel.

FIG. 14 is a plan view illustrating an alternative exemplary embodiment of a first pixel PX1. Hereinafter, repeated descriptions described hereinabove with respect to an exemplary embodiment of the first pixel PX1 will be omitted in descriptions with respect to an alternative exemplary embodiment of the first pixel PX1.

Referring to FIG. 14, an alternative exemplary embodiment of the first pixel PX1 may include a first substrate 111, a gate line GL, a gate electrode GE, a semiconductor layer SM, a data line DL, a source electrode SE, a drain electrode DE, a pixel electrode PE, and a common electrode CE, for example.

The pixel electrode PE and the common electrode CE may be disposed on a same layer or different layers, respectively. The pixel electrode PE and the common electrode CE generate together a horizontal electric field.

The pixel electrode PE and the common electrode CE may respectively have linear shapes that are alternately disposed on a plane, and may have a shape that is bent at least once on a plane to form a multi-domain as illustrated in FIG. 14. Based on the shape of the pixel electrode PE and the common electrode CE being bent, the data line DL may be bent into a similar shape as that of the pixel electrode PE and the common electrode CE.

As the pixel electrode PE and the common electrode CE have a multi-domain layout, a wide viewing angle may be achieved.

Figure 15:
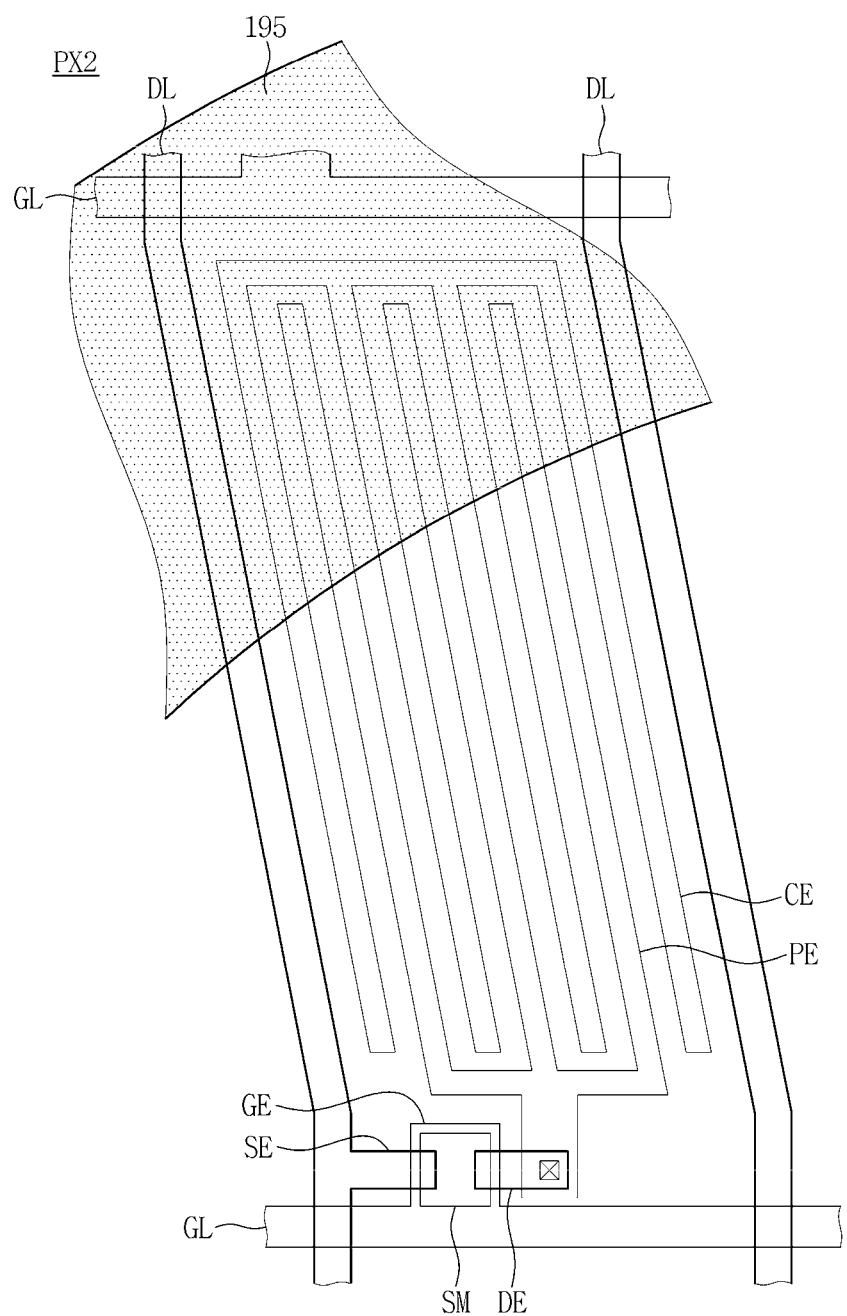
FIGS. 15 and 16 are plan views illustrating another alternative exemplary embodiments of a second pixel.
Figure 16:
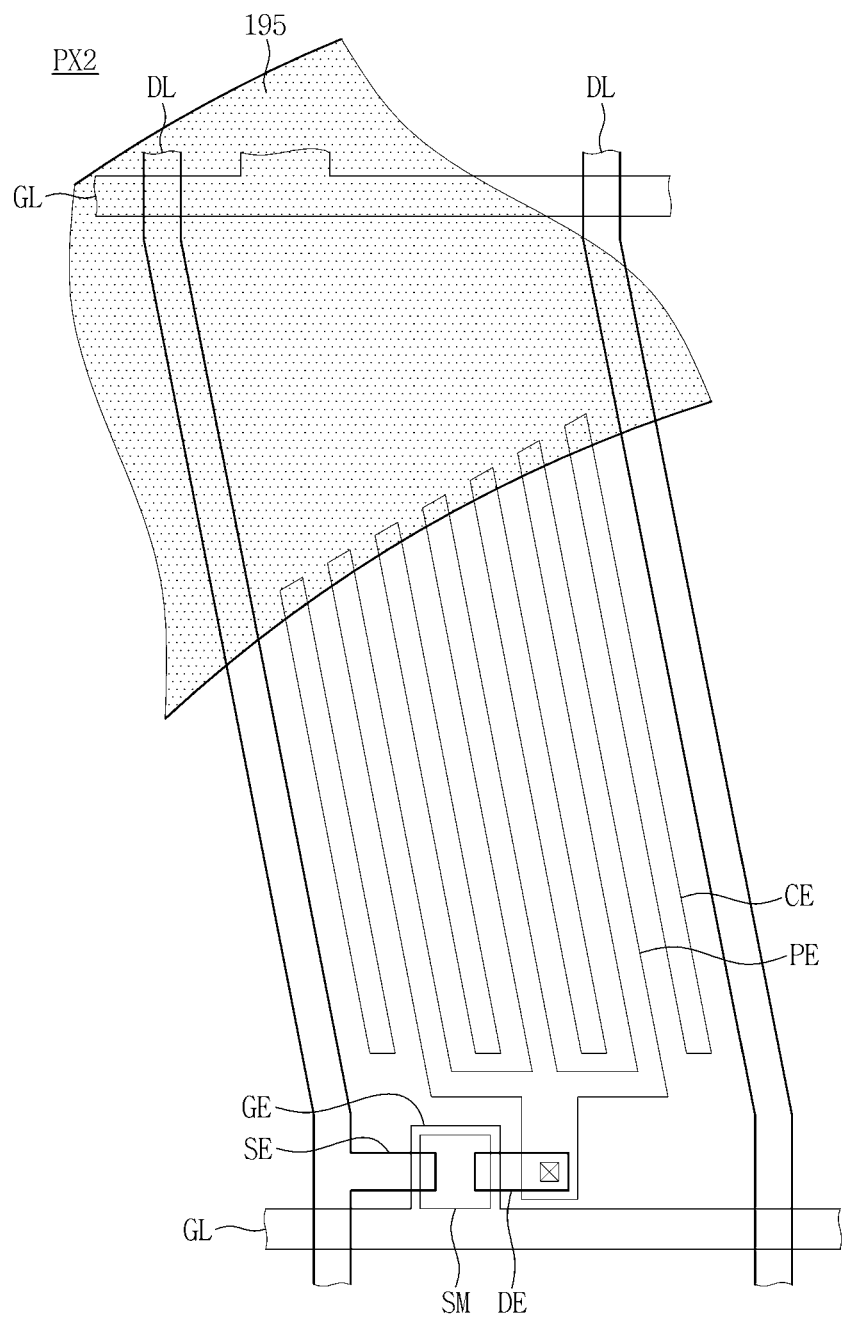

FIGS. 15 and 16 are plan views illustrating another alternative exemplary embodiments of a second pixel PX2. Hereinafter, repeated descriptions described hereinabove with respect to an alternative exemplary embodiment of the first pixel PX1 will be omitted in descriptions with respect to another alternative exemplary embodiment of the second pixel PX2.

Referring to FIG. 15, a pixel electrode PE and a common electrode CE of another alternative exemplary embodiment of the second pixel PX2 may respectively have linear shapes that are alternately disposed on a plane.

That is, the second pixel PX2 overlapping the first edge light blocking member 195 includes one domain, and all liquid crystal molecules on the second pixel PX2 may be initially aligned in a same direction.

As such, in this alternative exemplary embodiment of the LCD device, although a step difference occurs due to the first edge light blocking member 195, the second pixel PX2 overlapping the first edge light blocking member 195 only has a single domain, such that occurrence of a smear may be prevented.

In addition, referring to FIG. 16, the pixel electrode PE and the common electrode CE of the second pixel PX2 may have less planar area than the pixel electrode PE and the common electrode CE of the first pixel PX1.

Figure 17:
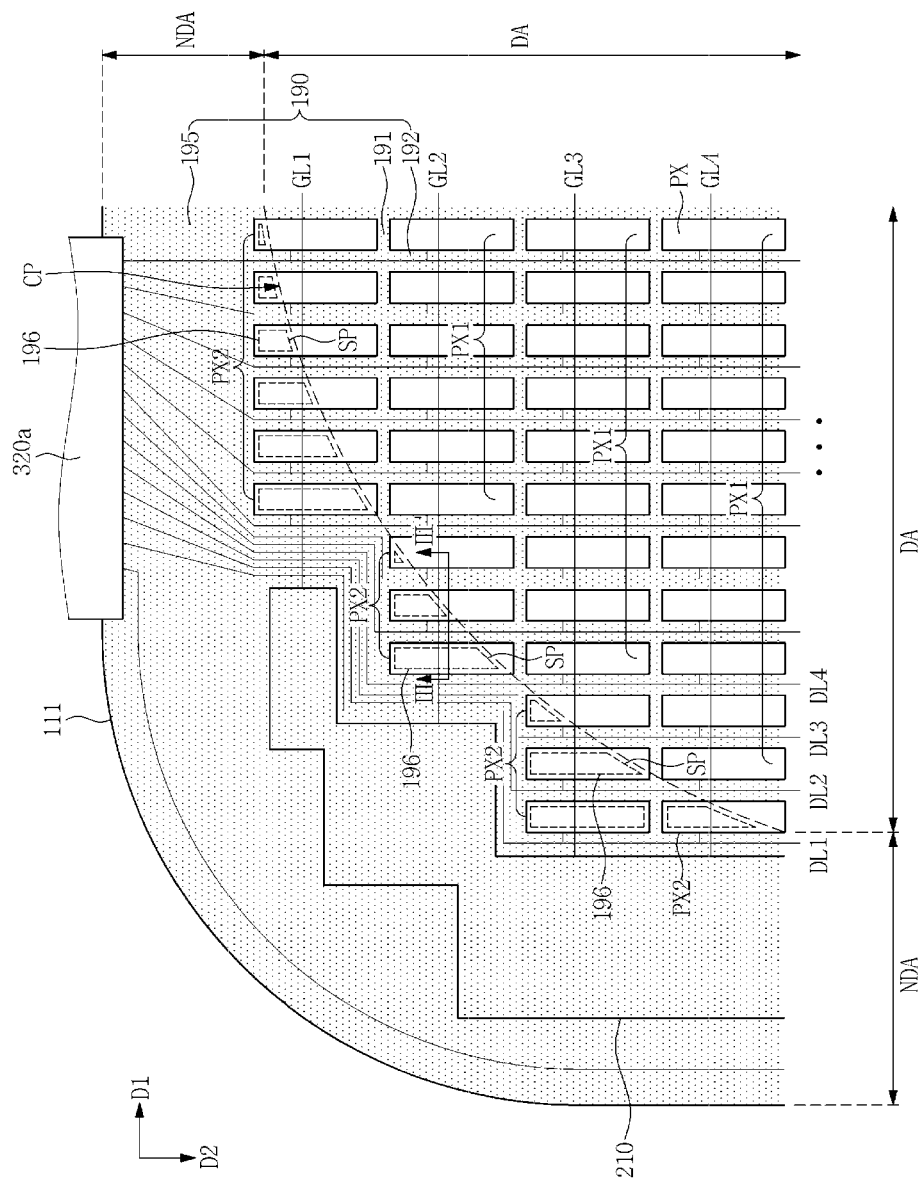
FIG. 17 is a plan view illustrating an alternative exemplary embodiment of an LCD device.
Figure 18:
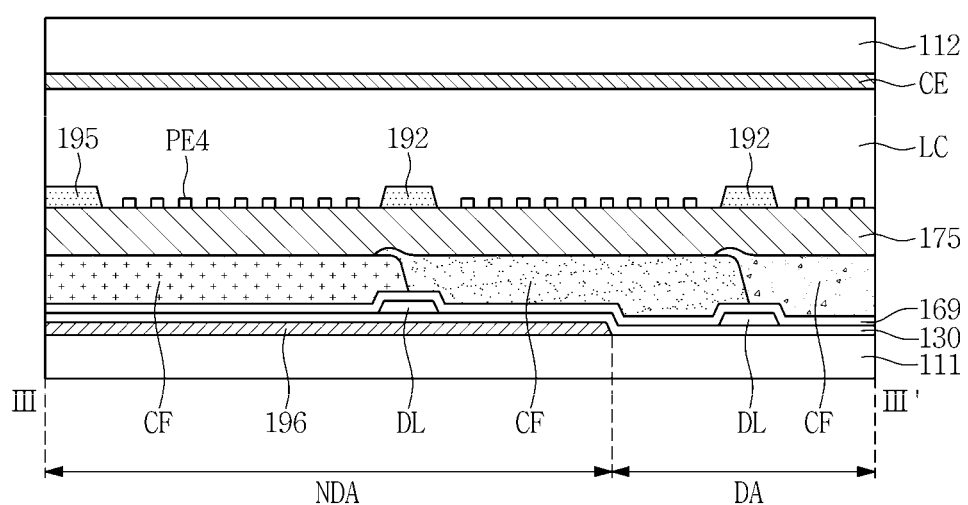
FIG. 18 is a cross-sectional view taken along line III-III' of FIG. 17.

FIG. 17 is a plan view illustrating an alternative exemplary embodiment of an LCD device, and FIG. 18 is a cross-sectional view taken along line III-III' of FIG. 17. Hereinafter, repeated descriptions described hereinabove with respect to an exemplary embodiment of an LCD device will be omitted in descriptions with respect to an alternative exemplary embodiment of an LCD device.

Referring to FIGS. 17 and 18, an alternative exemplary embodiment of an LCD panel 110 includes a plurality of gate lines GL1 to GLm (or GL) on a first substrate 111, a plurality of data lines DL1 to DLn (or DL) insulated from and intersecting the plurality of gate lines GL1 to GL, and a plurality of pixels PX which are connected to the plurality of gate lines GL1 to GLm and the plurality of data lines DL1 to DLn, respectively, to display an image.

A gate driver 210 is disposed adjacent to one end portion of the plurality of gate lines GL1 to GLm, and sequentially applies a gate voltage to the plurality of gate lines GL1 to GLm.

A data driver (not illustrated) is disposed adjacent to one end portion of the plurality of data lines DL1 to DLn, and includes a plurality of driving circuit boards 320a.

The LCD panel 110 further includes a light blocking member 190 on the first substrate 111. The light blocking member 190 includes a first light blocking member 191 extending in a first direction D1, a second light blocking member 192 extending in a second direction D2 which intersects the first direction D1, and a first edge light blocking member 195 disposed along an edge of the plurality of pixels PX.

According to an alternative exemplary embodiment, the first edge light blocking member 195 may be disposed in a staircase shape (not shown) along an edge of the plurality of pixels PX, but exemplary embodiments are not limited thereto.

The plurality of pixels PX may be classified as a first pixel PX1 disposed in an area not including a corner portion, and a second pixel PX2 disposed in the corner portion.

The plurality of pixels PX included in the second pixel PX2 may include second edge light blocking members 196 which defines a display area DA and a non-display area NDA. The second edge light blocking members 196 will be described under the assumption that one second edge light blocking member 196 is provided for every two second pixels PX2, but exemplary embodiments are not limited thereto. In another exemplary embodiment, one second edge light blocking member 196 may be provided for every plurality of second pixels PX2 that are adjacent to one another, even if this plurality constitutes more than two second pixels PX2. In addition, a second edge light blocking member 196 may extend to an edge of the first substrate 111 from a second pixel PX2.

At least some of the second edge light blocking members 196 in the second pixels PX2 may have different planar areas from one another. In addition, each of the second edge light blocking members 196 may have an inclined portion SP for distinguishing the display area DA and the non-display area NDA, and when connecting each of the inclined portions SP of the second edge light blocking members 196, a curved inner edge CP may be defined.

The second edge light blocking member 196 may be disposed on a same layer as a layer on which a gate wiring including the gate line and a gate electrode is disposed, and may be spaced apart from the gate wiring. In addition, the second edge light blocking member 196 and the gate wiring may include a same material, and may be simultaneously formed in a same process.

However, exemplary embodiments are not limited thereto, and the second edge light blocking member 196 may be disposed on a same layer as a layer on which a data wiring including the data line, a source electrode, and a drain electrode is disposed, and may be spaced apart from the data wiring. In addition, the second edge light blocking member 196 and the data wiring may include a same material, and may be simultaneously formed in a same process.

In addition, the second edge light blocking member 196 may be disposed on a same layer as a layer on which a color filter CF is disposed, and in such an exemplary embodiment, the second edge light blocking member 196 may include a red color filter and a blue color filter.

Figure 19:
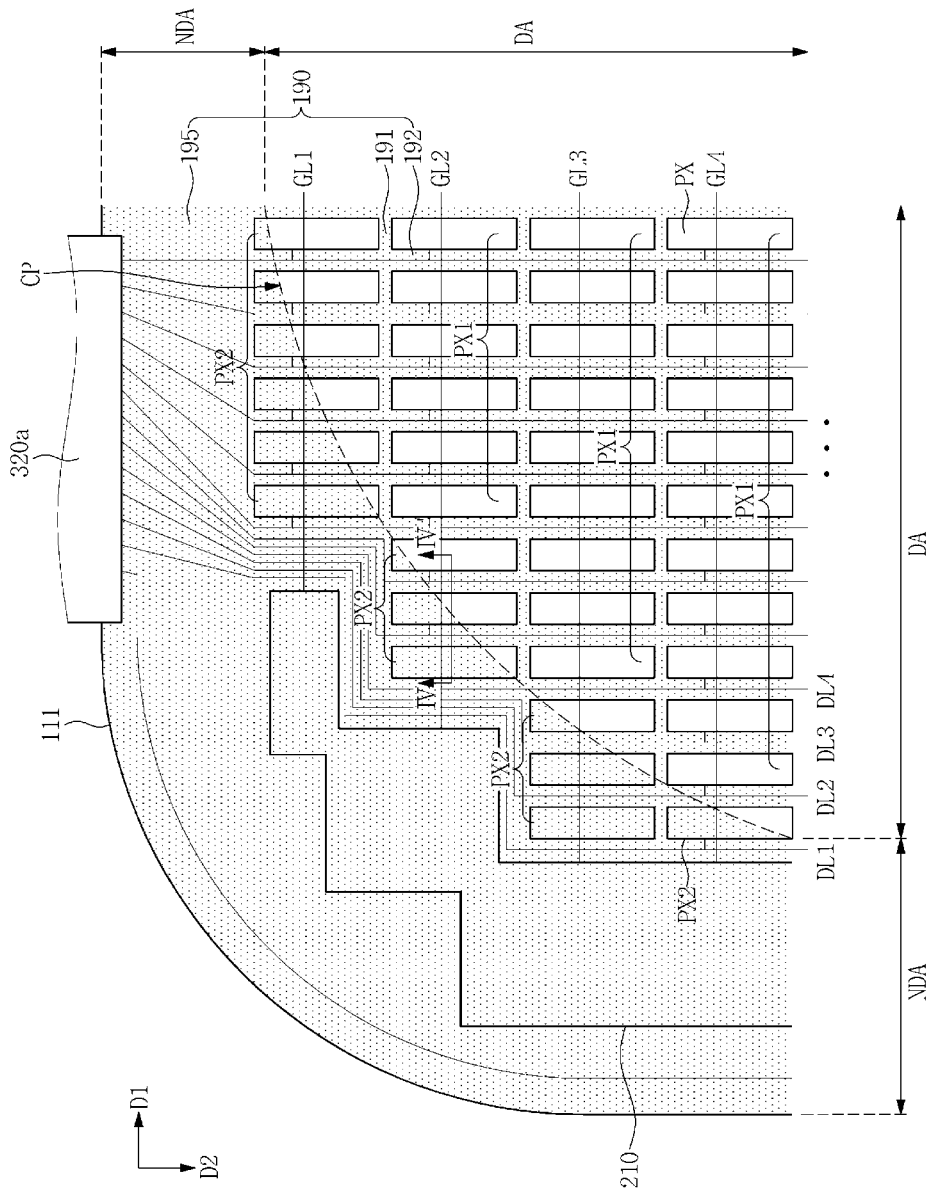
FIG. 19 is a plan view illustrating another alternative exemplary embodiment of an LCD device.
Figure 20:
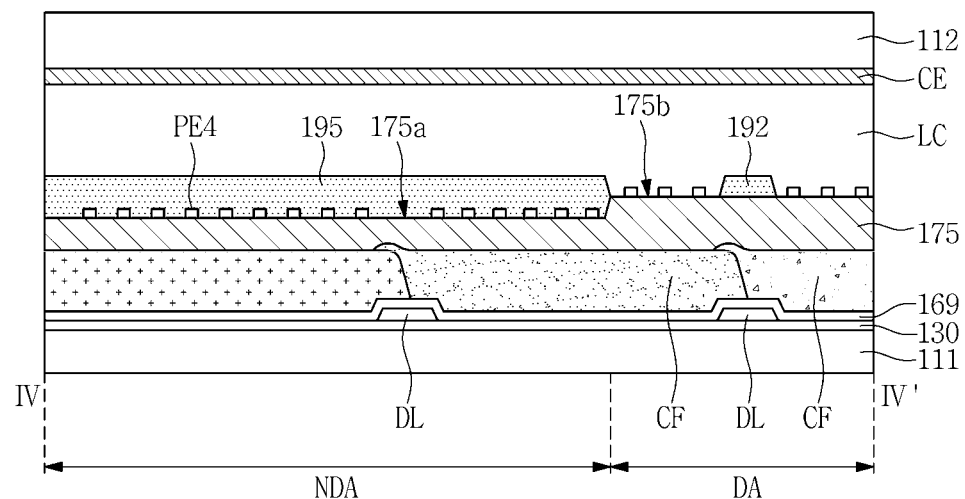
FIG. 20 is a cross-sectional view illustrating an exemplary embodiment taken along line IV-IV' of FIG. 19.

FIG. 19 is a plan view illustrating another alternative exemplary embodiment of an LCD device, and FIG. 20 is a cross-sectional view illustrating an exemplary embodiment taken along line IV-IV' of FIG. 19. Hereinafter, repeated descriptions described hereinabove with respect to an exemplary embodiment of an LCD device will be omitted in descriptions with respect to another alternative exemplary embodiment of an LCD device.

Referring to FIGS. 19 and 20, another alternative exemplary embodiment of an LCD panel 110 includes a plurality of gate lines GL1 to GLm (or GL) on a first substrate 111, a plurality of data lines DL1 to DLn (or DL) insulated from and intersecting the plurality of gate lines GL1 to GL, and a plurality of pixels PX which are connected to the plurality of gate lines GL1 to GLm and the plurality of data lines DL1 to DLn, respectively, to display an image.

A gate driver 210 is disposed adjacent to one end portion of the plurality of gate lines GL1 to GLm, and sequentially applies a gate voltage to the plurality of gate lines GL1 to GLm.

A data driver (not illustrated) is disposed adjacent to one end portion of the plurality of data lines DL1 to DLn, and includes a plurality of driving circuit boards 320a.

The LCD panel 110 may further include a light blocking member 190 on the first substrate 111. The light blocking member 190 includes a first light blocking member 191 extending in a first direction D1, a second light blocking member 192 extending in a second direction D2 which intersects the first direction D1, and a first edge light blocking member 195.

The first edge light blocking member 195 includes at least one curved inner edge CP having a predetermined curvature. A display area DA in which an image is displayed and a non-display area NDA in which an image is not displayed are defined by the first edge light blocking member 195.

The plurality of pixels PX include a first pixel PX1 not overlapping the curved inner edge CP of the first edge light blocking member 195 and a second pixel PX2 overlapping at least a portion of the curved inner edge CP of the first edge light blocking member 195.

A passivation layer 175 includes a first passivation layer 175*a* overlapping the first edge light blocking member 195 and a second passivation layer 175*b* not overlapping the first edge light blocking member 195. The first passivation layer 175*a* may have a lower height than that of the second passivation layer 175*b*.

Accordingly, a step difference that occurs due to the first edge light blocking member 195 may be reduced such that occurrence of a smear may be prevented.

Figure 21:
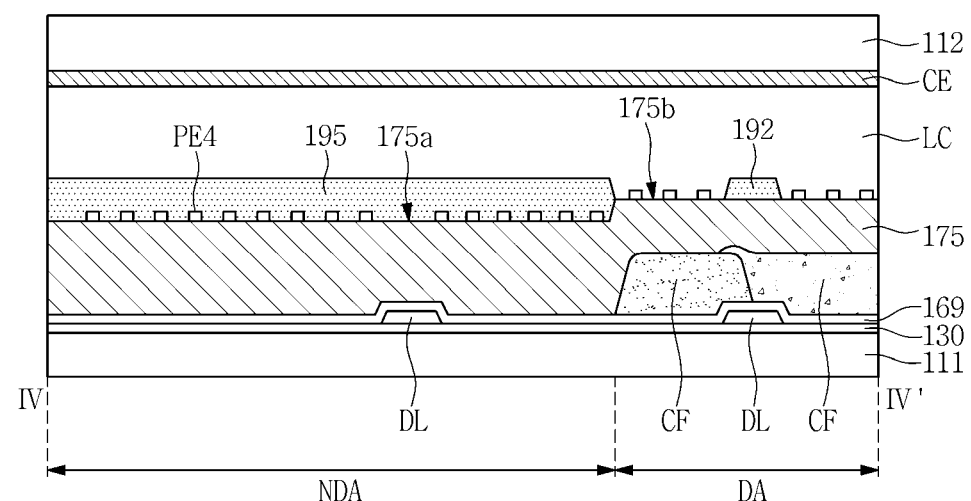
FIG. 21 is a cross-sectional view illustrating an alternative exemplary embodiment taken along line IV-IV' of FIG. 19.

FIG. 21 is a cross-sectional view illustrating an alternative exemplary embodiment taken along line IV-IV' of FIG. 19.

Referring to FIG. 21, according to an alternative exemplary embodiment, the passivation layer 175 includes a first passivation layer 175*a* overlapping the first edge light blocking member 195 and a second passivation layer 175*b* not overlapping the first edge light blocking member 195. The first passivation layer 175*a* may have a lower height than that of the second passivation layer 175*b*.

In addition, a color filter CF below the first passivation layer 175*a* may be omitted.

As such, in an alternative exemplary embodiment of the LCD device, a step difference that occurs due to the first edge light blocking member 195 may be prevented such that a smear that occurs due to the first edge light blocking member 195 may be prevented.

Figure 22:
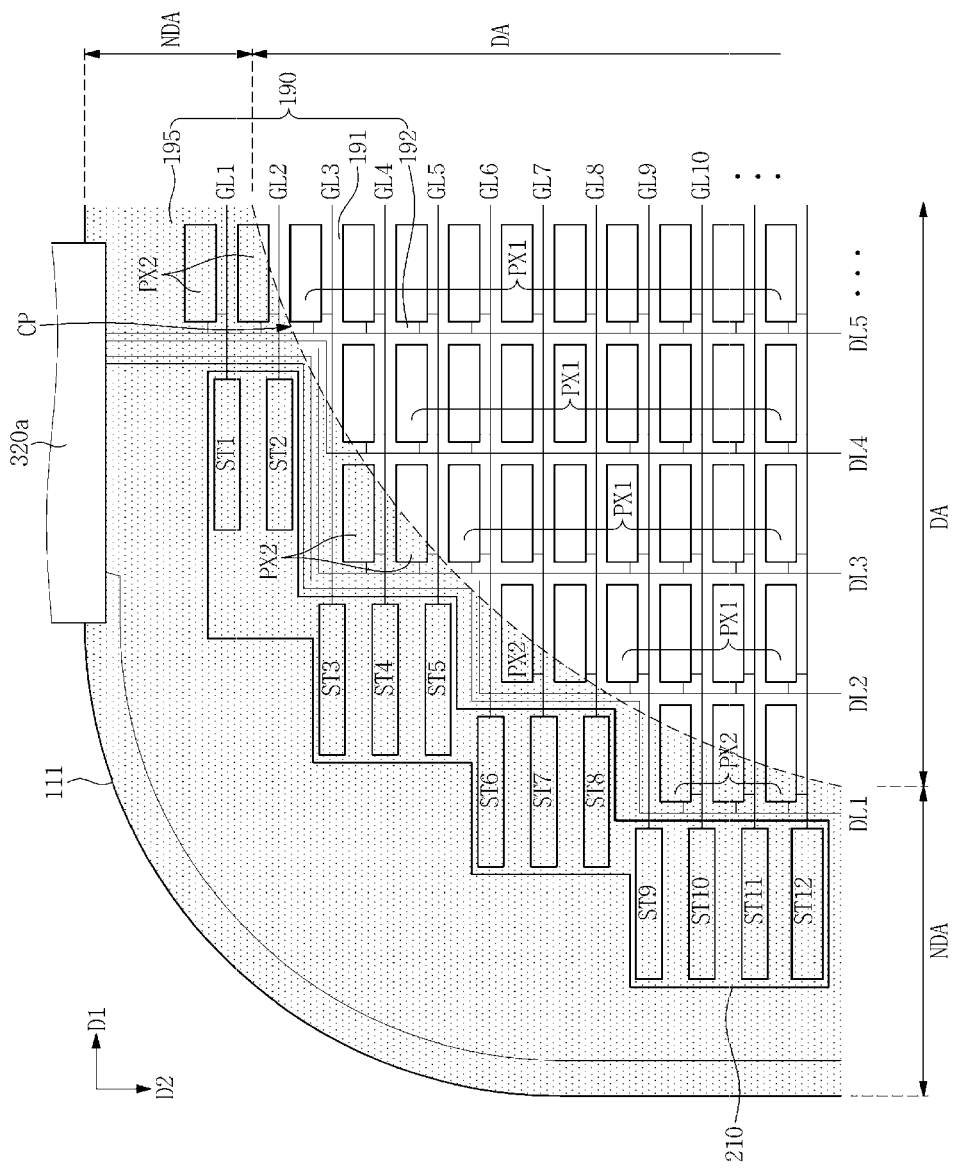
FIG. 22 is a partial enlarged view illustrating still another alternative exemplary embodiment of an LCD device.

FIG. 22 is a partial enlarged view illustrating still another alternative exemplary embodiment of an LCD device. Hereinafter, repeated descriptions described hereinabove with respect to an exemplary embodiment of an LCD device will be omitted in descriptions with respect to still another alternative exemplary embodiment of an LCD device.

Referring to FIG. 22, still another alternative exemplary embodiment of an LCD device includes a plurality of pixels PX that have a longer length in a first direction D1 than that in a second direction D2.

An LCD panel 110 includes a light blocking member 190 on a first substrate 111. The light blocking member 190 includes a first light blocking member 191 extending in the first direction D1, a second light blocking member 192 extending in a second direction D2 which intersects the first direction D1, and a first edge light blocking member 195.

The first edge light blocking member 195 includes at least one curved inner edge CP having a predetermined curvature. A display area DA in which an image is displayed and a non-display area NDA in which an image is not displayed are defined by the first edge light blocking member 195.

The plurality of pixels PX include a first pixel PX1 not overlapping the curved inner edge CP of the first edge light blocking member 195 and a second pixel PX2 overlapping at least a portion of the curved inner edge CP of the first edge light blocking member 195.

As the second pixel PX2 is arranged in a staircase shape on a plane, the gate driver 210 and the data lines DL1 to DLn connected to the second pixel PX2 may be arranged in a staircase shape.

For example, the gate driver 210 includes a plurality of stages ST1 to ST12 connected to respective ones of the gate lines GL1 to GLm, and a stage connected to the second pixel PX2 may protrude toward the second pixel PX2. As such, as the plurality of stages are arranged in a staircase shape, an area of the non-display area NDA may be significantly reduced (e.g., minimized).

In addition, the data lines DL1 to DLn connected to the second pixel PX2 may extend to be bent into a staircase shape, but exemplary embodiments are not limited thereto. In an exemplary embodiment, the data lines DL1 to DLn may extend to be bent into a diagonal line or a curved shape.

A pixel electrode of the first pixel PX1 has a different shape from a shape of a pixel electrode of the second pixel PX2. For example, the second pixel PX2 may have a single domain. Accordingly, a smear that occurs due to a step difference of the first edge light blocking member 195 may be prevented.

Although a step difference occurs, in an exemplary embodiment of an LCD device, due to a first edge light blocking member, a pixel overlapping the first edge light blocking member only has a single domain, such that occurrence of a smear may be prevented.

In another alternative exemplary embodiment of an LCD device, a first edge light blocking member and a pixel disposed in a corner portion are prevented from overlapping each other, such that occurrence of a smear may be prevented and a display area having a curvature may be achieved using a second edge light blocking member.

In still another alternative exemplary embodiment of an LCD device, a step difference that occurs due to the first edge light blocking member is complemented using a passivation layer and a color filter, for example, such that occurrence of a smear may be prevented.

As set forth hereinabove, in one or more exemplary embodiments of a display device that includes a display area having a curvature, a smear appearing at a curved portion may be significantly reduced.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A display device comprising:
a first substrate;
a second substrate covering the first substrate;
a liquid crystal layer between the first substrate and the second substrate;
a plurality of pixels on the first substrate; and
a light blocking layer disposed on at least one of the first substrate and the second substrate and defining a non-display area, the light blocking layer including a first edge light blocking layer member disposed along an edge of the first substrate or the second substrate in the non-display area,
wherein the plurality of pixels comprise:
a first pixel not overlapping the first edge light blocking layer in a plan view; and
a second pixel overlapping the first edge light blocking layer in a plan view, and
wherein a pixel electrode of the first pixel has a different shape from a shape of a pixel electrode of the second pixel in a plan view.

2. The display device as claimed in claim 1, wherein the second pixel is one of a plurality of second pixels arranged to have an outline of a staircase.

3. The display device as claimed in claim 1, wherein the first pixel comprises a greater number of liquid crystal domains than the number of liquid crystal domains of the second pixel.

4. The display device as claimed in claim 3, wherein the pixel electrode of the first pixel comprises a first sub-pixel electrode and a second sub-pixel electrode, each of the first sub-pixel electrode and the second sub-pixel electrode comprising a cross-shaped stem portion and a plurality of branch portions each diagonally extending in different directions, respectively, from the cross-shaped stem portion.

5. The display device as claimed in claim 4, wherein the pixel electrode of the second pixel comprises:
a third sub-pixel electrode comprising a stem portion and a plurality of branch portions diagonally extending in no more than one direction from the stem portion; and
a fourth sub-pixel electrode comprising a cross-shaped stem portion and a plurality of branch portions each diagonally extending in different directions, respectively, from the cross-shaped stem portion.

6. The display device as claimed in claim 5, wherein the branch portion of the third sub-pixel electrode is substantially perpendicular to an edge of the first edge light blocking layer, the edge overlapping the second pixel in a plan view.

7. The display device as claimed in claim 5, wherein the branch portion of the third sub-pixel electrode is substantially parallel to an edge of the first edge light blocking layer, the edge overlapping the second pixel in a plan view.

8. The display device as claimed in claim 1, wherein the light blocking layer covers less than all of the pixel electrode of the second pixel.

9. A display device comprising:
a first substrate;
a second substrate covering the first substrate;
a liquid crystal layer between the first substrate and the second substrate;
a plurality of pixels on the first substrate; and
a light blocking layer disposed on at least one of the first substrate and the second substrate and defining a non-display area,
wherein the light blocking layer comprises:
a first edge light blocking layer disposed along an edge of the first substrate or the second substrate in the non-display area, and
a plurality of second edge light blocking layers that are positioned on some of the plurality of pixels,
wherein the plurality of pixels comprise:
a first pixel not overlapping the first and second edge light blocking layers in a plan view, and
a second pixel overlapping the second edge light blocking layer in a plan view,
wherein a pixel electrode of the first pixel has a different shape from a shape of a pixel electrode of the second pixel in a plan view.

10. The display device as claimed in claim 9, wherein the second edge light blocking layer is formed on less than all of a second pixel.

11. The display device as claimed in claim 9, wherein the plurality of pixels comprises:
a gate line disposed on the first substrate and extending in a first direction;
a data line disposed on the first substrate to be insulated from the gate line and extending in a second direction which intersects the first direction; and
a color filter disposed on at least one of the first substrate and the second substrate and insulated from the gate line and the data line.

12. The display device as claimed in claim 11, wherein the second edge light blocking layer is disposed on a same layer as a layer on which the gate line is disposed.

13. The display device as claimed in claim 11, wherein the second edge light blocking layer comprises substantially a same material as that included in the gate line.

14. The display device as claimed in claim 11, wherein the second edge light blocking layer is disposed on a same layer as a layer on which the data line is disposed.

15. The display device as claimed in claim 14, wherein the second edge light blocking layer comprises substantially a same material as that included in the data line.

16. The display device as claimed in claim 11, wherein the second edge light blocking layer is disposed on a same layer as a layer on which the color filter is disposed.

17. The display device as claimed in claim 9, wherein the second edge light blocking layer comprises at least one color filter.

18. A display device comprising:
a substrate having a curved outer edge and a curved area adjacent to the curved outer edge;
a plurality of first pixels disposed on the substrate in rows and columns, wherein the number of first pixels in the rows varies;
a plurality of second pixels including a second pixel positioned at an end of each row wherein the end is in the curved area, wherein each second pixel has a pixel electrode that is shaped differently from a pixel electrode of the first pixel; and
a light blocking layer disposed to overlap the plurality of second pixels and not to overlap the first pixels in a plan view.

19. The display device of claim 18, wherein the light blocking layer has a curved inner edge that extends across at least some of the second pixels.

20. The display device of claim 19, wherein only each of the plurality of second pixels among the plurality of first pixels and the plurality of second pixels has a pixel electrode comprising a stem portion with parallel branch portions diagonally extending in no more than one direction.

21. The display device of claim 20, wherein the branch portions extend either parallel to or perpendicularly to the curved inner edge of the light blocking layer.

22. The display device of claim 18, wherein the light blocking layer is disposed along an outer edge of the substrate and defines a display area.

* * * * *